3,495,637
HAND-TYPE POWER TREE SHEARS
Harold L. Walsh, Park Rapids, Minn. 56470
Filed Dec. 14, 1966, Ser. No. 601,583
Int. Cl. B27g *13/00*
U.S. Cl. 144—34       1 Claim

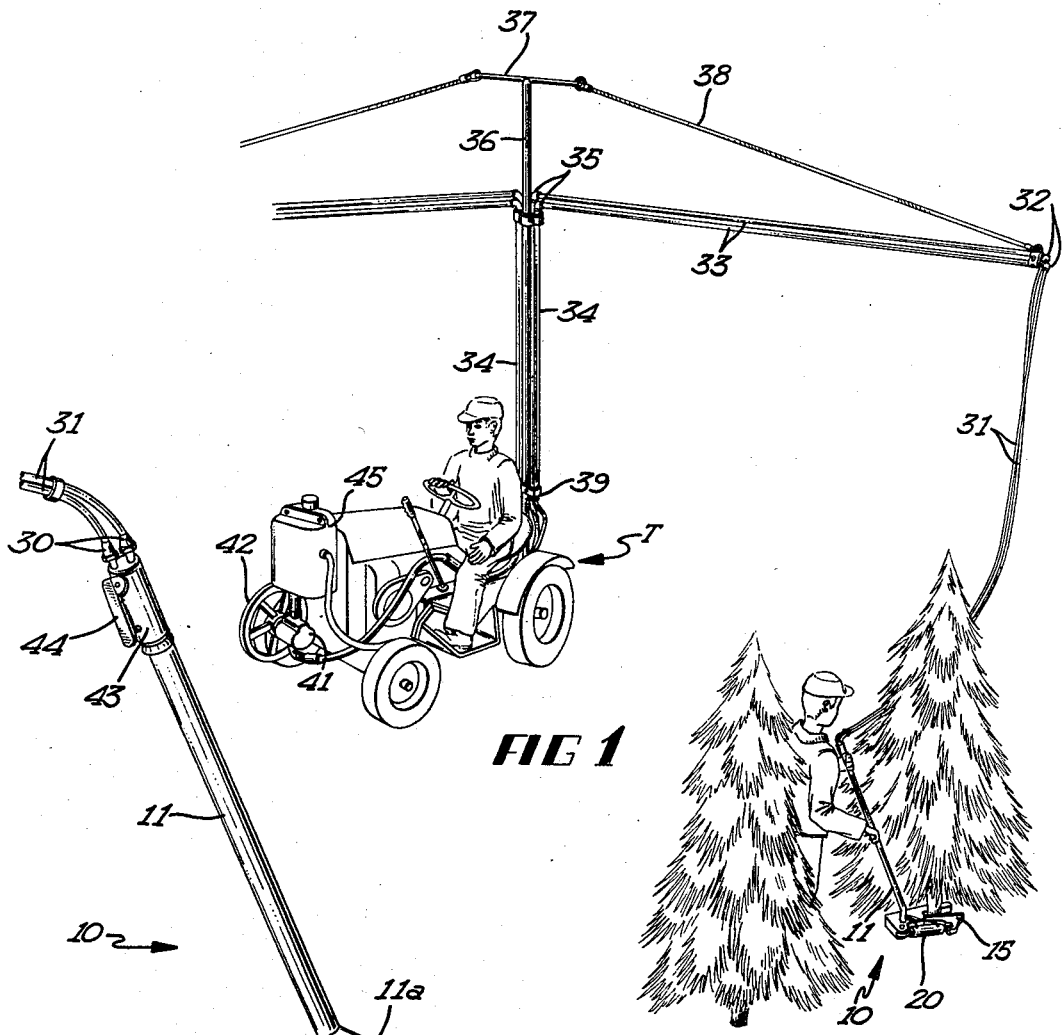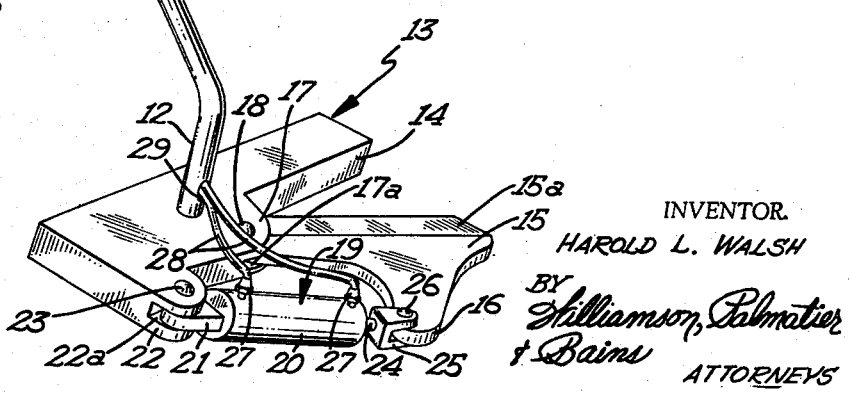

ABSTRACT OF THE DISCLOSURE

A power operated portable, hand-type tree shears including a handle having a mounting plate secured to one end thereof, and a blade pivotally mounted on the mounting plate. A cylinder and piston unit extending between and secured to the blade and mounting blade and being operable for shifting the blade towards and away from the mounting plate.

---

This invention relates to shears and more specifically to a portable, power operated, hand-type tree shears for cutting down small trees.

An object of this invention is to provide a novel and improved portable, power operated, hand-type shear device, which is especially adapted for use in readily cutting through the trunk of a small tree and which may be carried and operated by a single operator, thus permitting the rapid cutting and harvesting of small trees.

A more specific object of this invention is to provide a novel, portable, hand-type shear device, including a mounting plate having a handle thereon, with a blade pivotally secured to the mounting plate, and a piston and cylinder unit connected with the blade for power shifting the same.

These and other objects and advantages of this invention will more fully appear from the following description made in connection with the accompanying drawings, wherein like reference characters refer to the same or similar parts throughout the several views, and in which:

FIG. 1 is a perspective view of the novel shear device; and

FIG. 2 illustrates a manner of operation of the shear device.

Referring now to the drawings and more specifically to FIG. 1, it will be seen that one embodiment of the novel shear device, designated in its entirety by the reference numeral 10, is there shown.

The novel shear device 10 is a hand-type implement and includes an elongate generally tubular handle 11 preferably formed of a rigid, strong, lightweight material, such as aluminum or the like. The handle 11 has a handgrip element 11a integrally formed therewith intermediate the ends thereof, and it will be noted that this handgrip element 11a projects laterally therefrom. The lower terminal portion 12 of the handle 11 is bent and is rigidly attached to a stationary mounting plate 13. In the embodiments shown, the lower end of the handle 11 is internally threaded and threadingly engages an upstanding threaded lug secured to the upper surface of the stationary mounting plate 13. It will be noted, that the mounting plate 13 has substantially flat upper and lower surfaces, and as shown, is of substantially elongate configuration. Mounting plate 13 is also formed of a suitable rigid, metallic material, and a portion of one longitudinal edge thereof defines a substantially straight, normally vertically oriented, blade engaging surface 14.

It will be noted, that a substantially flat blade 15 is pivotally mounted on the mounting plate 13 and is swingable into and out of engaging relation with the blade engaging surface 14. To this end, it will be noted that the mounting plate 13 includes a laterally offset portion 17 which projects outwardly from the blade engaging surface 14 and which has a recess 17a therein, in which is positioned one end of the blade 15. A pivot 18 pivotally connects the blade 15 to the mounting plate so that when the mounting plate is horizontally oriented, the blade 15 is horizontally swingable about a substantially vertical axis.

The blade 15 has a tapered sharpened cutting edge 15a which extends throughout one longitudinal edge thereof and which is disposed in confronting relation with respect to the blade engaging surface 14. Blade 15 also has a laterally projecting arm or wing 16 integrally formed therewith and projecting laterally outwardly therefrom.

Means are provided for shifting the blade towards and away from the blade engaging surface and this means includes a hydraulic piston and cylinder unit 19. The piston and cylinder unit 19 is comprised of a cylinder 20 having an attachment ear 21 secured to one end thereof. The mounting 13 has a second offset portion 22 projecting laterally therefrom adjacent one end thereof and this offset portion 22 has a recess 22a therein in which is disposed the attachment ear 21 of the cylinder 20. The offset portion 22 as well as the ear 21 are suitably apertured to receive a pivot 23 therethrough, so that the cylinder 20 is pivotally connected to the mounting plate 13.

A piston rod 24 extends into the cylinder 20 and is secured to the piston which is axially movable in the cylinder. The outer end of the piston rod 24 is bifurcated as at 25, and is pivotally connected by a pivot 26 to the outer end portion of the arm 16 of blade 15. Thus, it will be seen that when piston and cylinder unit is extended, the blade 15 will be swung towards and in engaging relation with the blade engaging surface 14. Conversely, when the piston and cylinder unit is retracted, the blade will be swung away from the blade engaging surface.

The piston and cylinder unit 19 is of the double acting type and suitable fittings 27 are connected in communicating relation with the chamber of the cylinder. Each fitting 27 is also connected in communicating relation to one end of one of a pair of elongate flexible conduits 28 and these conduits extend through an opening 29 formed in the lower end of the elongate handle 11. The upper end of the handle 11 has a two way valve mechanism 43 mounted thereon and this two way valve mechanism has a manually operable valve actuator member 44, which is movable to actuate the valve element of the valve mechanism to cause extension and retraction of the piston and cylinder unit. The valve mechanism 43 is connected in communicating relation with the conduits 28.

The housing of valve mechanism 43 has a pair of fittings 30 secured thereto and communicating therewith, and these fittings are in turn connected in communicating relation to one end of a pair of elongate flexible conduits 31. The conduits 31 are formed of suitable flexible material and have their opposite ends connected to fittings 32, which are connected in communicating relation to a pair of horizontal rigid conduits or pipes 33. The opposite end of each pair of the horizontal pipes 33 is connected to the upper ends of a pair of vertical rigid conduits or pipes 34 by means of an elbow 35. The lower ends of the vertical pipes 34 are connected to flexible conduits 40 which are mounted on a conventional garden type tractor T. It will be noted, that two or more shear devices may be used in conjunction with a single source of hydraulic fluid under pressure. In the embodiment shown, the garden-type tractor provides the fluid under pressure.

The tractor T has a vertically extending standard 36 secured thereto and projecting upwardly therefrom, the standard having a rigid transverse member 37 secured to the upper end thereof. Opposite ends of the transverse member 37 are connected to one end of a pair of cables 38, and the respective other ends of the cable are secured to the outermost ends of the horizontal pipes 33. Straps 39 secure the vertical pipes 34 to the standard 36 and permit revolving movement of the vertical pipes about their longitudinal axis. Thus, it will be noted that the vertical and horizontal pipes together with the standard, comprise a boom for the fluid pressure lines to each shear device.

The conduits 40 associated with the tractor T are connected in communicating relation to a pump 41, which is operated by the power takeoff 42 of the tractor. The pump, in turn, is connected in communicating relation to a reservoir 45, which contains a supply of hydraulic fluid therein.

In operation, a pair of the hand-type shear devices 10, will be supplied with hydraulic fluid from a single tractor. An operator will grasp the handgrip element 11 with each elongate handle with one hand, and will operate the valve mechanism 43 with his other hand. The piston and cylinder unit will be shifted to the retracted position as illustrated in FIG. 1, and the operator will position the shear device so that the trunk of a tree or limb to be severed, is positioned between the blade engaging surface 14 and the cutting edge 15a of the blade 15. Because of the flat configuration of the blade and mounting plate, the tree trunk may be severed adjacent the surface of the ground.

It is merely necessary for the operator to shift the valve operator member 44, so that the piston and cylinder unit are extended to power shift the blade about its pivot towards the blade engaging surface. The blade will very effectively and quickly cut through the trunk of relatively small trees, especially those having a diameter of 4 inches or less. The operator may then actuate the valve operator member 44 to retract the piston and cylinder unit, so that the blade is pivoted away from the blade engaging surface. Thus, the harvesting of Christmas trees may be very quickly and effectively carried out.

The shear device also has utility in clearing operations wherein underbrush (small trees and the like) may be very quickly and effectively removed. Because of its lightweight construction, and flat configuration of the blade and mounting plate, the shear device is also especially adaptable for use in pruning operations.

From the foregoing description, it will be seen that I have provided a novel hand-type shear implement which may be easily carried and operated by a single user, thus permitting rapid cutting and harvesting of small trees and the like.

From the preceding paragraphs, it will be seen that I have provided a novel power operated, hand-type shear implement, which is not only of simple and inexpensive construction, but one which functions in a more efficient manner than any heretofore known comparable device.

It will, of course, be understood that various changes may be made in the form, details, arrangement and proportions of the various parts without departing from the scope of my invention.

What is claimed is:
1. A hand-type portable, power operated shears comprising
    an elongate hollow handle,
    a substantially flat mounting plate secured to one end portion of said handle,
    a substantially flat blade pivotally mounted on said plate and being swingable into and out of engaging relation therewith,
    a cylinder and piston unit spaced from said handle and including a cylinder having one end pivotally connected to said mounting plate, a piston rod extending from the other end of said cylinder and being pivotally connected to said blade, said cylinder and piston unit being extensible and retractable to move the blade towards and away from said mounting plate,
    flexible conduits connected in communicating relation with said cylinder and piston unit and extending longitudinally through said handle, and being connected to a source of hydraulic fluid under pressure,
    and a manually operable control valve on the other end of said handle and disposed in fluid controlling relation with said cylinder piston unit for operating said blade,
    and rigid vertical conduits connectible to the source of hydraulic fluid under pressure for mounting on a tractor to permit swinging movement of the conduits as a unit about their vertical longitudinal axes, rigid horizontal conduits each connected in communicating relation with the upper end of one of said vertical conduits, each of said flexible conduits being connectible in communicating relation with the outer end of one of said rigid horizontal conduits.

References Cited

UNITED STATES PATENTS

| 2,228,635 | 1/1941 | Magennis | 30—228 |
| 2,699,756 | 1/1955 | Miller | 144—34 |

FOREIGN PATENTS

| 1,185,852 | 2/1959 | France. |
| 138,110 | 10/1960 | U.S.S.R. |

DONALD R. SCHRAN, Primary Examiner